US005891327A

United States Patent [19]

Taunk

[11] Patent Number: 5,891,327

[45] Date of Patent: Apr. 6, 1999

[54] CENTRIFUGE TUBE WITH ROTATIONAL POSITION INDEX

[75] Inventor: Dale S. Taunk, San Jose, Calif.

[73] Assignee: Axygen, Inc., Fremont, Calif.

[21] Appl. No.: 679,092

[22] Filed: Jul. 10, 1996

[51] Int. Cl.[6] .......... B01D 35/00

[52] U.S. Cl. .......... 210/85; 210/91; 209/725

[58] Field of Search .......... 209/725, 728, 209/729; 210/513, 781, 782, 85, 91

[56] References Cited

U.S. PATENT DOCUMENTS

| | | | |
|---|---|---|---|
| 3,648,843 | 3/1972 | Pearson | 210/443 |
| 4,392,950 | 7/1983 | Beery | 209/733 |
| 4,726,902 | 2/1988 | Hubbard | 209/728 X |
| 4,921,618 | 5/1990 | Hamlin | 210/782 X |
| 4,957,637 | 9/1990 | Cornell | 210/782 |

FOREIGN PATENT DOCUMENTS

| | | | |
|---|---|---|---|
| 8803045 | 5/1988 | WIPO | 210/782 |

*Primary Examiner*—Tuan N. Nguyen
*Attorney, Agent, or Firm*—Glen R. Grunewald

[57] ABSTRACT

A centrifuge tube having an indexing tab or indentation on a flange surrounding the tube to establish rotational orientation of the tube with respect to the cavity of a centrifuge.

3 Claims, 2 Drawing Sheets

CENTRIFUGE TUBE WITH ROTATIONAL POSITION INDEX

TECHNICAL FIELD

This invention is in the field of tubes used to contain materials during centrifugal separation.

BACKGROUND ART

Centrifugal separation of suspensions of solid particles in liquids is essential in many procedures. For example, centrifugal separation is used to purify protein conjugates and to desalt and purify peptides prior to electrophoresis. There are many other centrifugal separations that are used in industry and in laboratories.

Usually a centrifugal separation is effected by placing the suspension to be separated in a small plastic tube, called a centrifuge tube, which is placed in a cavity in a centrifugal separating apparatus, and then the tube and its contents are subjected to a spinning action so that centrifugal force causes many multiples of gravity within the tube. As a result, the solids in the suspension accumulate at the bottom of the tube in what is know as a pellet. The pellet is recovered by decanting the liquid. The tube must be removed from the centrifuge for it to be examined to determine if the extent of the separation is adequate. If the initial centrifugal separation is not complete, a second separation is necessary for a longer period of time or at a higher rotational speed.

In some centrifugal separations the pellet must be dried which is frequently accomplished by decanting the liquid from the centrifuge tube and then filling the tube with a drying medium such as alcohol, which dissolves the water in the pellet that was not removed by decanting. The drying process may dislodge some of the particles from the pellet so that after drying it is necessary to subject the tube containing the drying medium to further centrifugal separation to force all of the solid particles back into the pellet. Any time the centrifuge tube is removed from the centrifuge cavity and replaced in a different orientation with respect to a centrifuge cavity, the pellet is disturbed and the time for centrifugal separation must be repeated. Reforming the pellet is time consuming and it is particularly wasteful if the objective of removing the centrifuge tube was only for the purpose of observing whether the separation was complete.

DISCLOSURE OF THE INVENTION

This invention is a tube for use with a centrifuge that provides exact orientation of the centrifuge tube with respect to the cavity of the centrifugal separator that receives it so that the centrifuge tube may be removed from and returned to the centrifuge cavity as many times as are necessary or desirable without disturbing the orientation of the tube with respect to the centrifuge cavity and therefore without disturbing the pellet. The ordinary tube used with a centrifuge includes a flange that limits the extent that the tube can enter the centrifuge cavity. This flange prevents the tube from entering the cavity in the centrifuge except to the extent that it is desirable while the centrifuge is in operation. The flange must be positioned on the tube to leave room for a screw cap to seal the top of the tube if a sealed tube is required for the centrifugal separation. In the tube of this invention the flange includes an indexing means which marks a particular location on the flange.

BEST MODE FOR CARRYING OUT THE INVENTION

Figure 1:
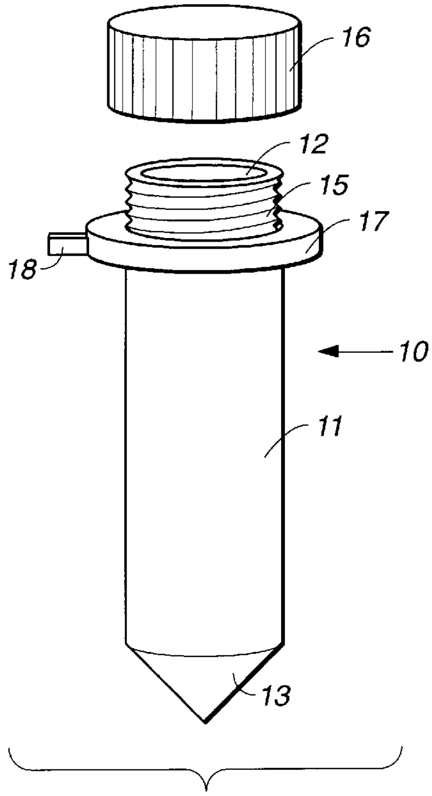
FIG. 1 is a perspective view of a centrifuge tube embodying this invention.
Figure 2:
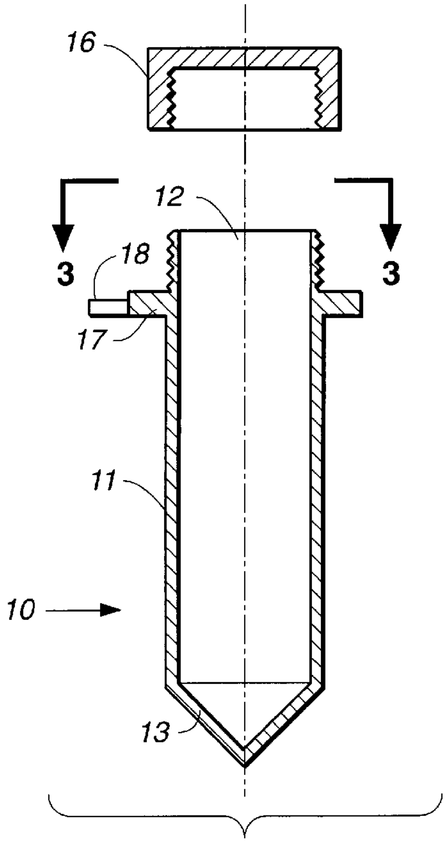
FIG. 2 is a cross section elevation view of the centrifuge tube illustrated in FIG. 1.

The centrifuge tube of this invention is generally illustrated as 10. The tube comprises a container portion 11 into which the material to be separated is introduced. The container portion 11 has an open top 12 and a closed bottom 13. In the illustrated example the closed bottom 13 has a conical shape although the closed bottom may be flat or curved. The centrifuge tube of this invention is particularly useful for that character of tube that has a screw cap for a closure. Adjacent to the opening 12 is a threaded portion 15 that engages with threads within the screw cap 16 so that a tight seal can be readily maintained by the force exerted by threads of the threaded portion 15. An O-ring may be placed in cap 16 to better effect a seal. A flange 17 is on an intermediate portion of the container 11 and adjacent to the end of the threaded portion 15. The flange 17 is large enough in diameter to engage the cavity of a centrifuge thereby preventing the entire centrifuge tube from entering the cavity, all as is common to and known to the art.

As illustrated in FIGS. 1, 2, 4 and 5, the flange 17 has an indexing tab 18 integral with it. The indexing tab 18 protrudes beyond the periphery of flange 17 and beyond the periphery of screw caps 16 so that it is visible when the screw cap and centrifuge tube are assembled in liquid-tight relationship. The axial extent of tab 18, is such that no portion of tab 18 extends above flange 17, and no portion of tab 18 extends below flange 17 whereby flange 17 can rest flat against the opening of a centrifuge cavity so that the tube 10 can be aligned parallel with the axis of the cavity and so that the cap 16 can screw onto threaded portion 15 to depth where the bottom of cap 16 will not contact the upper surface of flange 17. The index tab 18 extends from the flange 17 a distance greater than the outside diameter of cap 16 so that it can be seen when cap 16 is screwed onto container 11.

Figure 4:
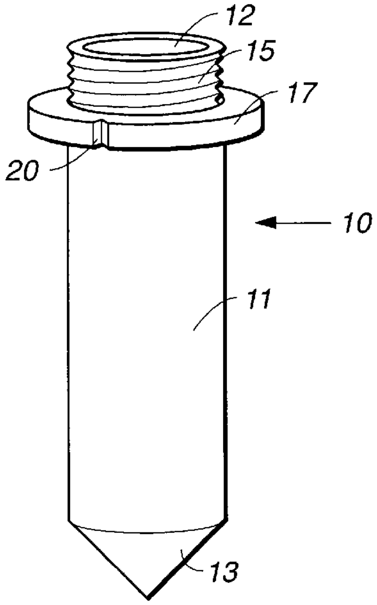
FIG. 4 is a perspective view of another centrifuge tube embodying this invention.
Figure 3:
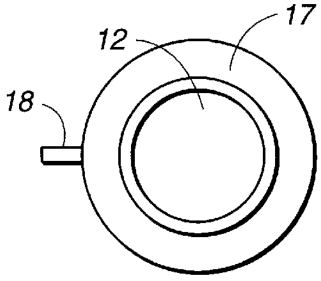
FIG. 3 is a plan view of FIG. 2 taken along the line 3—3.

FIG. 4 illustrates another embodiment of this invention wherein the rotational position index element is a notch 20 in the flange 17. The notch 20 will not interfere either with a complete assembly of cap 16 or with positioning flange 17 flat against the receiving portion of a centrifuge cavity. The notch 20 is an index of the rotational position of the entire tube 10 so that it can locate a position relative to a centrifuge cavity accurately.

Figure 5:
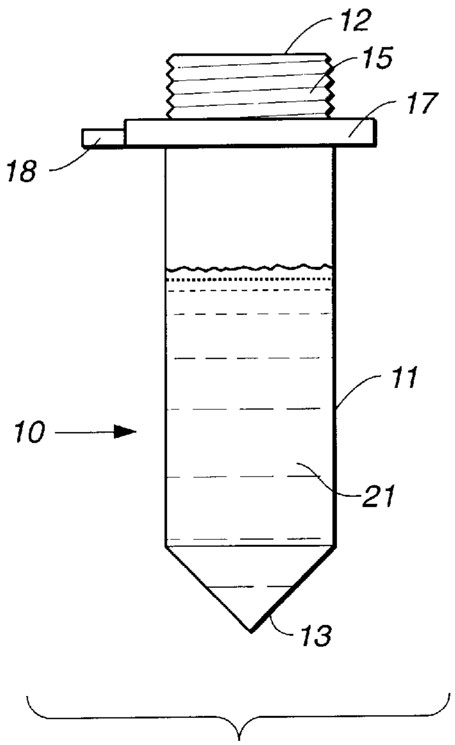
FIG. 5 illustrates a centrifuge tube embodying this invention containing a suspension of solids in a liquid.
Figure 6:
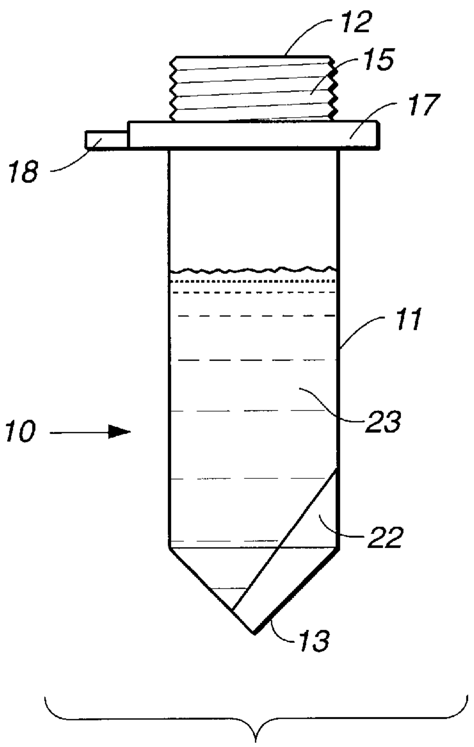
FIG. 6 is the tube of FIG. 5 after being centrifuged to form a pellet.

In use, as illustrated in FIG. 5, a centrifuge tube 10 is filled with a suspension to be separated into a solid portion and a liquid portion. The charge to centrifuge tube 10, illustrated as 21, is enclosed within container portion 11 with a screw cap 16, illustrated in FIGS. 1 and 2. Tube 10 is then placed in the receiving cavity of a centrifuge which is not shown. The receiving cavity of the centrifuge is marked either when the tube is placed in the receiving cavity or it has a prepositioned mark. The mark may be permanent—for example, a scratch or small dent in the opening of the centrifuge cavity; or it may be applied with a small ink mark when the centrifuge tube is placed in it. At any rate, the index tab 18 of the centrifuge tube is aligned with the mark on the opening of the centrifuge cavity. When the tube 10 is correctly positioned within the centrifuge cavity, a centrifugal separation may be effected for as long and at as fast a speed as is desired, and the centrifugal separation may be stopped at any time and the tube 10 removed from the cavity to be examined. If the centrifugal separation was adequate, then the liquid is decanted and the pellet may be treated however is appropriate for the type of material and the degree of separation necessary. If the separation is not adequate, the tube 10 may be returned to the centrifuge cavity in exactly the same orientation it was in when the centrifugal separation procedure began. Additional centrifugal separation may then be effected. When the centrifugal separation has been adequately performed, the tube 10 may be removed from the centrifuge cavity, and at that point it will appear as illustrated in FIG. 6 which illustrates a clear liquid layer 23 and a pellet 22 that has been separated from the liquid. The pellet 22, as illustrated in FIG. 6, is typical of the shape of a pellet from a centrifugal separation. It forms in this shape because the tube 11 is neither horizontal nor vertical during the centrifugal separation.

Some centrifugal separations are repeated after addition of more liquid to the tube 10 or using a different suspension for the second centrifugal separation so that the solids from both liquids are deposited in the pellet. Other times the centrifugal separation is repeated if the pellet is to be washed with a liquid different from the liquid of the original suspension. In all such cases where multiple separations are effected or multiple passes of a single separation are effected, it is essential to orient tube 10 in a centrifuge cavity the same as it was oriented during each of a series of centrifugal treatments of the tube. This invention provides a means whereby no matter how many times the sample is centrifuged and no matter how many different suspensions or liquids are employed in the procedure, the pellet 22 will always have the same orientation with respect to the centrifuge; and none of the material in pellet 22 will be forced back into suspension within the liquid because of the centrifugal forces involved in the separation.

What is claimed is:

1. A centrifuge tube comprising:

a cylindrical container portion having a threaded opening to receive a threaded cap and a closed end, the threads of said open end terminating adjacent to a flange, said flange surrounding said container portion, said flange comprising two flat surfaces perpendicular to the axis of said container portion and an outer edge surface connecting said flat surfaces to each other, and said outer edge surface having indexing means fixed thereon, said indexing means positioned to be visible when said cap is engaged on said threaded opening.

2. The tube of claim 1 wherein said indexing means comprises a tab extending radially from said flange.

3. The tube of claim 1 wherein said indexing means comprises an indentation in said edge surface.

* * * * *